Nov. 13, 1928.

J. W. WELSH 1,691,596

OPHTHALMIC MOUNTING

Filed June 12, 1925

INVENTOR
JAMES W. WELSH by David Rines
ATTORNEY

Patented Nov. 13, 1928.

1,691,596

UNITED STATES PATENT OFFICE.

JAMES WILSON WELSH, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Application filed June 12, 1925. Serial No. 36,592.

The present invention, though having also other fields of usefulness, relates more particularly to ophthalmic mountings and methods of making the same. From a more limited aspect, the invention relates to ophthalmic mountings comprising endless, circular lens-holding rims, and more particularly to mountings of the all-"shell" type, constituted of non-metal material, like celluloid, zylonite and the like.

A source of difficulty with ophthalmic mountings the lens-receiving grooves of which are circular is that the lenses tend to rotate in their grooves. A number of proposals have been made to prevent this rotation, many of which have had to do with a metal member projecting from the wall of the groove and into engagement with a notch provided in the periphery of the lens. The projection thus locks the lens against rotation. Some proposals have had to do with a permanently embedded metal member; and others with a removable member. The former has been found to be commercially impractical; and removable metal members, though answering the requirements well, have been found, sometimes, to project too far into the lens-receiving groove, and, at other times, not far enough. In either case, the task of the optician who inserts the lenses in their grooves has been made, by so much, the more difficult.

According to the invention illustrated and described in a copending application, Serial No. 23,440, filed April 16, 1925, the optician is enabled to determine for himself just how far the lens-locking member shall project from the wall of the lens-receiving groove. He is thus freed from the arbitrary caprice of the manufacturer who supplies him with the ophthalmic mountings. Not only this, but the optician may permanently secure the lens-lock in just the desired position, and projecting neither too far from nor too near to the wall of the lens-receiving groove. The advantages of a removable locking member are thus combined with those of the permanently embedded member, without the disadvantages of either.

A chief object of the present invention is to improve upon the invention of the above-described application. Other and further objects will be explained hereinafter and will be particularly pointed out in the appended claims.

Figure 1:
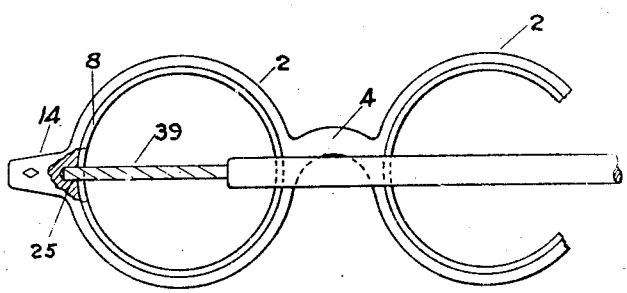
Figures 2, 3:
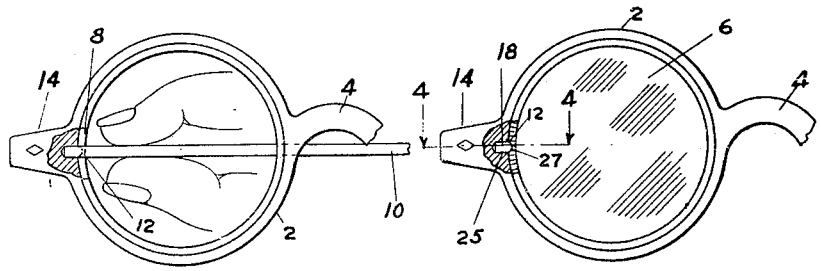
Figure 4:
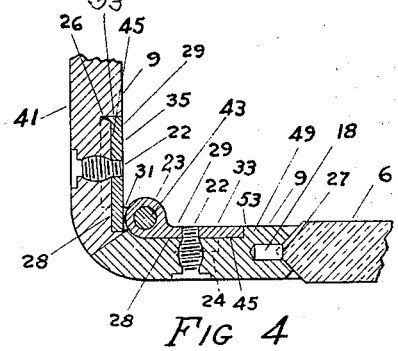
Figure 5:
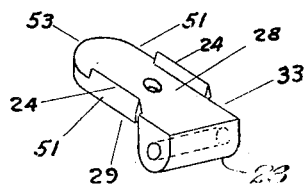
Figure 6:
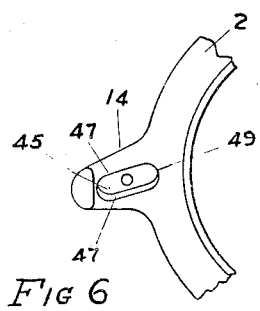

The invention will be explained in connection with the accompanying drawings in which Figs. 1 and 2 are fragmentary elevations, partly in section, of an ophthalmic mounting, illustrating two steps in the preferred method of the present invention; and Fig. 3 is a similar view illustrating the ophthalmic mounting of the present invention in its preferred form. Fig. 4 is a section taken upon the line 4—4 of Fig. 3, showing also a temple in similar section hinged to the lens-holding front; Fig. 5 is a perspective view of one of the hinge plates shown in Fig. 4; and Fig. 6 is a perspective view of one of the end pieces of the ophthalmic mounting shown in Figs. 1 to 4, inclusive, with adjacent parts, prior to the insertion therein of the hinge plates.

Ophthalmic mountings of the above-described character, constituted of non-metal material, like celluloid, zylonite and the like, comprise a lens-holding front having two endless rims 2 integrally connected together by a bridge 4, and each having integral temple end pieces 14 that extend at one side of the lens-holding front. The bridge and the end pieces need not, however, be integral. They may be made of metal or other material and they may be attached to the rims in any well-known manner.

The lens-receiving grooves 8 of the rims 2 are generally circular, as shown. Lenses 6 mounted in such grooves have a tendency to turn. This tendency exists even when the rims are not, strictly, circular. To prevent the rotation of the lens, according to the invention of the above-described application, the lens-receiving groove 8 is provided with a cylindrical notch 25, positioned preferably near the end piece 14. The mounting may be supplied to the optician already provided with these notches 25, one in each rim, or the optician may make these notches 25 himself, as by drilling with a drill 39, or in any other desired way. If the patient requires a spherical lens, the rotation of which is not harmful, the notch 25 is disregarded, and the lens is mounted in position as though the groove 8 were not provided with the notch 25. In cases where the patient requires a type of lens that must be fixed against rotation, however, the optician, after notching the lens at 27 so as to register with the notch 25 in the mounting, inserts the end of a cylindrical rod 10 into the notch 25 and cuts it off at 12, so that the cut portion 18 shall project beyond the walls of the groove 8 just the right distance so as to enter the notch 27, and not too far or too little. The optician may thus make the notch 27 of such dimension as hardly to be noticeable, when the mounting is worn on the face; and he may make the projection 18 just fit the notch 27. The rod 10 is constituted of the same non-metal material as the material of the mounting, like celluloid, zylonite and the like. This material is very easily cut at 12; and there is the further advantage that the plug 18 may be integrally connected to the material of the mounting. The plug may, for example, be cemented rigidly in place in the notch 25 if the end of the rod 10 is dipped in a suitable solvent, like acetone, before it is positioned in the notch 25.

The dimensions may be varied in accordance with conditions; but it is found that a very effective lens-lock may be produced,—the locking plug 18 and notch 27 of which are hardly noticeable—by having the plug 18 extend about two millimeters. The diameter of the notch may be about six hundredths of an inch.

Temples 41 are pivotally connected to the end pieces 14 by hinges comprising one-piece hinge plates 33 and 35. Each hinge plate is provided with a base portion having oppositely disposed, substantially flat, inner and outer faces or sides 28 and 29. Two perforated ears or knuckles 31 are integrally disposed laterally upon one side 29 of the hinge plate 35, out of the general plane of the base portion, nearer one end thereof than the other, as illustrated, and the hinge plate 33 is similarly provided with an ear or knuckle 23. The hinge plates are pivoted together by a pivot pin or pintle 43 that extends through the perforations in the knuckles.

One of the hinge plates, as the hinge plate 33, is mounted upon the rear face of the non-metal end piece 14. The other hinge plate 35 is mounted upon the inner face of the end portion of the temple. One face 9 of both the end portion of the temple and of the end piece 14 is recessed, the bottom wall of the recess 45 being substantially flat and the recess being shown provided with longitudinally extending walls 47 and that are connected by a transversely extending wall 49. The hinge plates 33 and 35 are similarly substantially flat and are provided with oppositely disposed walls 51 that are connected by a wall 53. The hinge plates and the recesses are so shaped that the hinge plates will fit tightly in the recesses, the hinge plates lying flat against the bottom flat walls of the recesses, with the walls 51 in contact with the walls 47, and the wall 53 in contact with the wall 49. The walls 47, 49, 51 and 53 are made blunt to prevent rotation or twisting of the hinge plates within the recesses 12. A single rivet or screw 22 extending through the hinge plate and the non-metal member, will be found sufficient to hold the hinge plates within their respective recesses. As is explained in a copending application, Serial No. 477,146, filed June 13, 1921, which matured on March 16, 1926 into Patent No. 1,576,868 the screw 22 may be upset by pressure applied to the opposite ends of the screw.

As is also explained in the said Patent No. 1,576,868, it is preferred to provide the hinge plates with anchoring or attachment members that project integrally from the sides or edges 51 of the hinge plates and that are caused to bite or wedge laterally into and become embedded within the non-metal material. These attachment members, according to the preferred construction, comprise oppositely disposed beveled wings 24, preferably along the oppositely disposed walls 51, and a beveled wing 26, preferably along the wall 53, continuously connecting the beveled wings 24 to form a continuous, beveled, offset flange. The hinge plate after being fitted into position in the recess 12, is forced home by pressure, flush with the face 9, causing the beveled wings to bite or wedge into, and become embedded within, the non-metal material, as above described.

The wing 26, so close to the notch 25, has a tendency to weaken the non-metal material, and cause breakage. According to the present invention, therefore, the hinge plate 33 is provided with the wings 24 only symmetrically positioned on both sides of the notch 25.

It will be understood that the invention is not restricted to the exact embodiment thereof that is illustrated in the accompanying drawings and described herein; and that all modifications within the skill of the artisan are considered to be within the spirit and scope of the present invention, as defined in the appended claims.

What is claimed is:

1. An ophthalmic mounting comprising a non-metal member having a lens-receiving groove provided with a notch, a non-metal member seated in the notch and rigid with and projecting from the wall of the groove, the second-named member being adapted to engage a lens, and a metal member mounted on the first-named non-metal member adjacent to the notch and having wings embedded in the first-named non-metal member on both sides of the notch.

2. An ophthalmic mounting comprising a non-metal front provided with an end piece having a recess the bottom of which is substantially flat and the walls of which are blunt and provided with a lens-receiving groove having a notch, a substantially flat metal plate seated in the recess, and having oppositely disposed wings biting into and embedded within the non-metal material on both sides of the notch, and a non-metal member seated in the notch and projecting from the wall of the groove and adapted to engage a lens.

3. An ophthalmic mounting comprising a front constituted of a plastic material provided with an end piece having a recess provided with longitudinally extending walls connected by a transversely extending wall, the said front having a lens-receiving groove provided with a notch, a plate seated within the recess having walls in tightly-fitted contact with the recess walls, and having oppositely disposed beveled offset wings near the longitudinally extending walls biting into and embedded within the end piece on both sides of the notch, and a non-metal member seated in the notch and projecting from the wall of the groove and adapted to engage a lens.

4. An ophthalmic mounting comprising a non-metal front having a lens-receiving groove provided with a notch and an end piece, a temple, and a hinge pivotally connecting the front and the temple and comprising two hinge plates, one of the hinge plates being seated in the temple flush with a face thereof and the other hinge plate being seated in the end piece flush with a face thereof, the end-piece hinge plate being positioned adjacent to the notch and being reduced in cross section near the notch, whereby the material of the end piece is not weakened near the notch, and a member seated in the notch and projecting from the wall of the groove, and adapted to engage a lens.

In testimony whereof, I have hereunto subscribed my name.

JAMES W. WELSH.